United States Patent [19]

Hornblad et al.

[11] Patent Number: 5,412,547
[45] Date of Patent: May 2, 1995

[54] ILLUMINATABLE RECHARGEABLE DISPLAY DEVICE

[75] Inventors: Richard P. Hornblad, Shorewood; Kenneth J. Rabas, Waukesha; Michael R. Sturm, Grafton; Jerome A. Zakrajsek, Fredonia, all of Wis.

[73] Assignee: DCI Marketing, Milwaukee, Wis.

[21] Appl. No.: 170,693

[22] Filed: Dec. 21, 1993

[51] Int. Cl.6 ............................................. F21L 7/00
[52] U.S. Cl. .................................. 362/183; 362/194; 362/195; 362/253; 40/331; 40/332
[58] Field of Search ............... 362/183, 96, 194, 195; 40/331, 332

[56] References Cited

U.S. PATENT DOCUMENTS

| 2,414,446 | 1/1947 | Carbone | 362/253 X |
| 3,021,468 | 2/1962 | Reich | 362/183 X |
| 3,109,132 | 10/1963 | Witte | 362/183 X |
| 3,120,632 | 2/1964 | Hopt et al. | 362/183 X |
| 3,286,385 | 11/1966 | Tate, Jr. | 40/332 X |
| 3,321,861 | 5/1967 | Tate, Jr. | 362/183 X |

Primary Examiner—Ira S. Lazarus
Assistant Examiner—Thomas M. Sember
Attorney, Agent, or Firm—Michael, Best & Friedrich

[57] ABSTRACT

A lightable display device including a base, a handle including a light source for illuminating the display device, a rechargeable battery coupled to the light source for energizing the light source, and means for effecting the recharging of the rechargeable battery in a conventional electrical outlet, and means for removably securing the handle to the base.

6 Claims, 1 Drawing Sheet

ILLUMINATABLE RECHARGEABLE DISPLAY DEVICE

FIELD OF THE INVENTION

The invention relates to a display device and, more particularly, to an illuminatable and rechargeable display device.

BACKGROUND OF THE INVENTION

Display devices such as knobs for draught beer taps and taps for dispensing other liquids have been made in various sizes and shapes in an attempt to achieve point of purchase promotion of a particular product. While these proposals have met with some success, it is more desirable to provide some eye catching feature with the display device in order to attract customer attention. For example, U.S. Pat. No. 3,762,086, issued to Horbinski, depicts a rotatable tap knob. Proposals such as a illuminatable tap knobs have previously been considered inadequate to attract customer attention due to the need to supply a power source, complexity and cost.

SUMMARY OF THE INVENTION

The invention provides a lightable display device including a base and a handle. The handle includes a light source, a rechargeable battery for energizing the light source, and means for effecting the recharging of the battery in a conventional electrical outlet. The invention also includes means for removably securing the base to the handle.

One object of the invention is to provide an illuminated display device including a battery that is capable of being recharged.

Another object of the invention is to provide an economical illuminated display device that is visually attractive as well as eye catching.

Other objects and advantages of the invention will become apparent to those of ordinary skill in the art upon review of the following drawings, detailed description, and claims.

Figure 1:
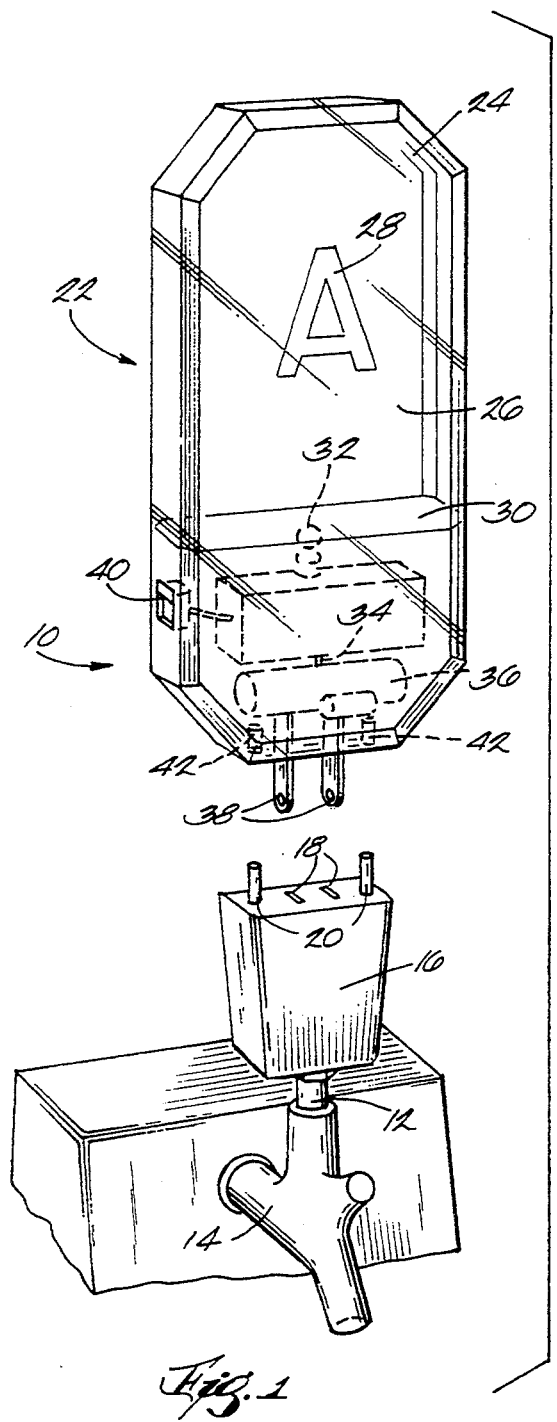
FIG. 1 is a perspective view of the display device embodying the invention.

Before the two embodiments of the invention are explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Display devices embodying the invention will be hereafter described as knobs for draught taps. However, it should be appreciated that the display device of the invention can be adapted to various apparatus where a lightable point of purchase promotion is desired.

Referring to the drawings, there is shown in FIG. 1 a lightable knob 10 mounted on a shaft 12 which is connected to a valve 14. The shaft 12 opens and closes the valve 14 to enable dispensing of a liquid. When the shaft 12 and knob 10 are generally in the vertical position, valve 14 is closed and when the shaft 12 and knob 10 are pivoted towards the vendor, the valve 14 is open. The details of valve 14 are conventional and need not be described for purposes of the description of this invention.

Specifically, the knob 10 includes a base 16 which is fixed to the shaft 12. The base 16 includes a pair of slots 18 and a pair of posts 20. A handle 22 is removably secured to the base 16 and includes a body 24 that is preferably fabricated from a material such as a rigid plastic. The body 24 can be of any shape and preferably includes a first portion or display area 26 that is transparent. The display area 26 can include indicia 28 identifying or promoting the particular product. The body 24 also includes a second portion 30 that is translucent. The second portion 30 includes a light source such as light bulb 32. A conventional rechargeable battery 34 is coupled to the light bulb 32 for energizing the light bulb 32.

Continuing to refer to FIG. 1, means are provided on the knob 10 for effecting the recharging of the rechargeable battery 34 in a conventional electrical outlet (not shown). The recharging means can be a conventional recharger unit 36 that includes a pair of male prongs 38 extending downwardly from the body 24. The male prongs 38 are insertable into and compatible with the conventional electrical outlet. A switch 40 is included on the body 24. The switch 40 is coupled to the rechargeable battery 34 for turning the light bulb 32 on (on position), for turning the light bulb 32 off (off position) and for intermittently turning on or flashing the light bulb 32 (flash position). The flashing of the light bulb is accomplished by a conventional circuit which, for example, may incorporate a bimetallic element or a timer/oscillator combination. Means are further included on the knob 10 for removably securing the handle 22 to the base 16. These means can include the pair of male prongs 38 in conjunction with the slots 18 and/or a pair of bores 42, adjacent the male prongs 38 on the handle 22, in conjunction with the posts 20.

To assemble the knob 10, the handle 22 is secured to the base 16 through insertion of the male prongs 38 into the slots 18 and, simultaneously, through insertion of the posts 20 into the bores 42. The knob 10 can then be used by the vendor to actuate the valve 14 to dispense a beverage. If illumination of the knob 10 is desired, the switch 40 is placed in the on position and the rechargeable battery 34 energizes the light bulb 32 thus illuminating the knob 10. If flashing of the knob 10 is desired, the switch 40 is placed in the flash position and the rechargeable battery intermittently energizes the light bulb 32. If illumination of the knob 10 is no longer desired, the switch 40 is placed in the off position and the rechargeable battery does not energize the light bulb 32.

When the rechargeable battery 34 is in need of a charge, the handle 22 is removed from the base 16 by upward movement of the handle 22 to free the male prongs 38 and the posts 20 from the slots 18 and bores 42 respectively. The handle 22 is then placed in a conventional electrical outlet by plugging the male prongs 38 into the outlet. The handle 22 is left in the outlet for a period of time during which the recharger unit 36 effects the recharging of the rechargeable battery 34. After the rechargeable battery 34 has received a charge, the handle 22 can then be replaced in the base 16 and illuminated as desired.

Figure 2:
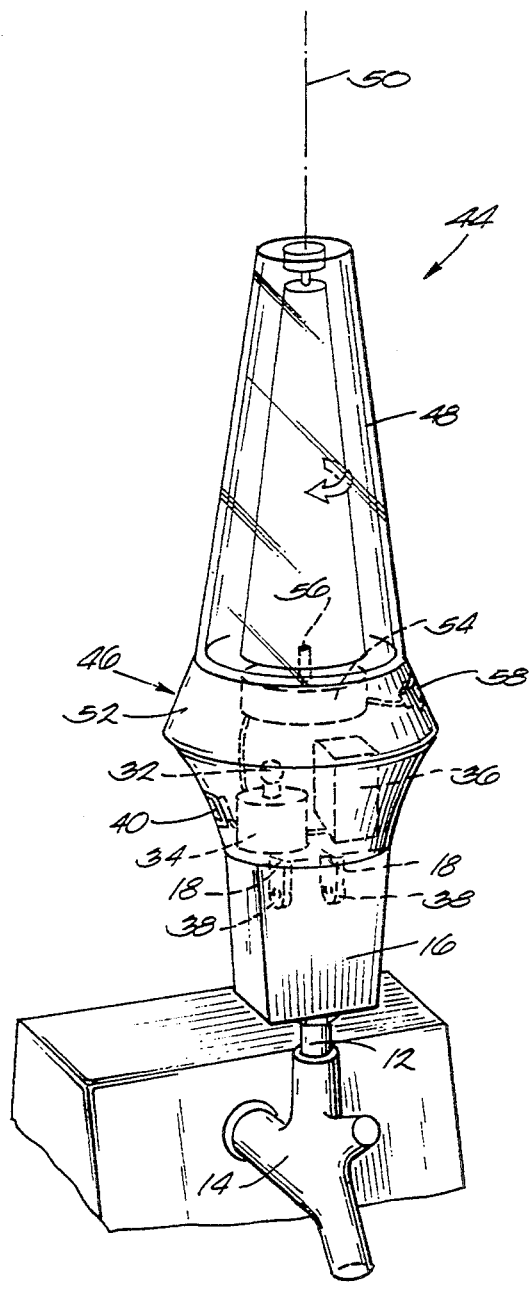
FIG. 2 is a perspective view of an alternate embodiment of the display device.

Referring now to FIG. 2, there is shown an alternate embodiment of the display device which is a lightable and rotatable knob 44, wherein like reference numerals correspond to like elements. The knob 44 is mounted on a shaft 12 which is connected to a valve 14. The knob 44 includes a base 16 which is fixed to the shaft 12. The base 16 includes a pair of slots 18. A handle 46 is removably secured to the base 16 and is preferably fabricated of a material such as a rigid plastic.

The handle 46 of knob 44 includes a rotatable member 48 that can be utilized as a display area for identifying or promoting the particular product. The rotatable member 48 is rotatable about a longitudinal axis 50. The handle 46 also includes a second portion 52 that includes a light source such as a light bulb 32, a conventional rechargeable battery 34 that is coupled to the light bulb 32, a conventional recharger unit 36 including a pair of male prongs 38, and a first switch 40 for effecting the illumination, disillumination, and intermittent illumination of the light bulb 32. The second portion 52 also includes a motor 54 coupled to the rechargeable battery 34 and also coupled to the rotatable member 48 via a rod 56. To rotate the rotatable member 48, the motor 54 spins the rod 56 which transfers rotational movement to the rotatable member 48. A second switch 58 selectively couples the motor 54 to the rechargeable battery 34 for selecting whether to have the rotatable member 48 rotate. The second portion 52 also includes means for removably securing the handle 22 to the base 16. These means can include the pair of male prongs 38 in conjunction with the slots 18.

The knob 44 is assembled and operated in the same manner as set forth with respect to knob 10 depicted in FIG. 1 with the additional operative feature that if rotation of the rotatable member 46 is desired, the switch 58 is activated and if rotation is no longer desired, the switch 58 is deactivated. Further, the rechargeable battery 34 within knob 44 is recharged in the same manner as with knob 10.

We claim:

1. A lightable knob for a tap valve comprising:
  a base adapted to be attached to a tap valve, wherein said base includes a pair of slots;
  a handle including a light source for illuminating said handle, a rechargeable battery coupled to said light source for energizing said light source, and recharger means coupled to said rechargeable battery for effecting the recharging of said rechargeable battery in a conventional electrical outlet, said recharger means including a pair of male prongs which are insertable into and compatible with the conventional electrical outlet; and
  means for removably securing said handle to said base wherein said securing means includes said slots and said pair of male prongs which are insertable into said slots.

2. A lightable knob for a tap valve as set forth in claim 1 and further including means for intermittently illuminating said light source.

3. A lightable knob for a tap valve as set forth in claim 1 wherein said handle further includes a rotatable member and a motor, said motor being coupled to said rechargeable battery and to said rotatable member for causing rotation of said rotatable member.

4. A lightable knob for a tap valve comprising:
  a base adapted to be attached to the tap valve and having therein a pair of slots;
  a handle including a light source for illuminating said handle, a rechargeable battery coupled to said light source for energizing said light source, and a recharger coupled to said rechargeable battery for effecting the recharging of said rechargeable battery in a conventional electrical outlet, said recharger including a pair of male prongs which are insertable into and compatible with the conventional electrical outlet and which are insertable into said slots to secure said handle to said base.

5. A lightable knob for a tap valve as set forth in claim 4 and further including means for intermittently illuminating said light source.

6. A lightable knob for a tap valve as set forth in claim 4 wherein said handle further includes a rotatable member and a motor, said motor being coupled to said rechargeable battery and to said rotatable member for causing rotation of said rotatable member.

* * * * *